(No Model.) 2 Sheets—Sheet 1.

A. SPEIRS.
FEATHER RENOVATOR.

No. 265,453. Patented Oct. 3, 1882.

WITNESSES.
Wm. S. Goodwin
John P. Kerrigan

INVENTOR.
Alexander Speirs
Per attys.
Clifford & Clifford (No Model.)  A. SPEIRS.  2 Sheets—Sheet 2.

FEATHER RENOVATOR.

No. 265,453.  Patented Oct. 3, 1882.

WITNESSES.  INVENTOR.
Wm. H. Goodwin.  Alexander Speirs
John P. Kerrigan  Per atty,
  Clifford & Clifford

UNITED STATES PATENT OFFICE.

ALEXANDER SPEIRS, OF WINDHAM, MAINE.

FEATHER-RENOVATOR.

SPECIFICATION forming part of Letters Patent No. 265,453, dated October 3, 1882.

Application filed April 22, 1882. (No model.)

*To all whom it may concern:*

Be it known that I, ALEXANDER SPEIRS, of Windham, in the county of Cumberland and State of Maine, have invented certain new and useful Improvements in Feather-Renovators; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1:
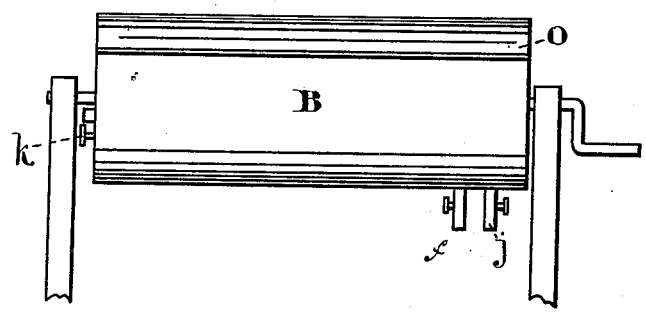
Figure 2:
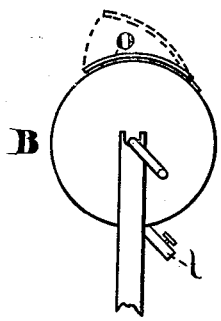
Figure 3:
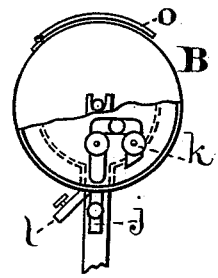
Figure 4:
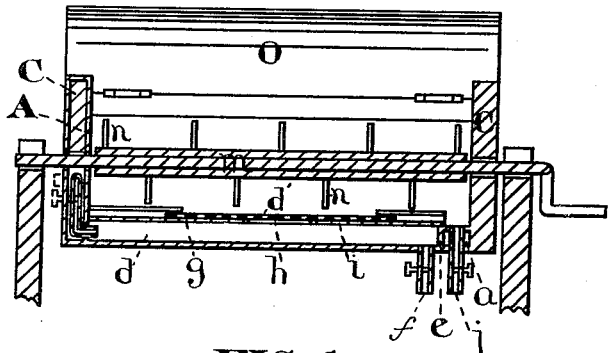
Figure 5:
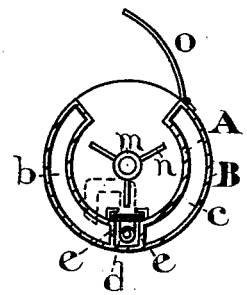
Figure 6:
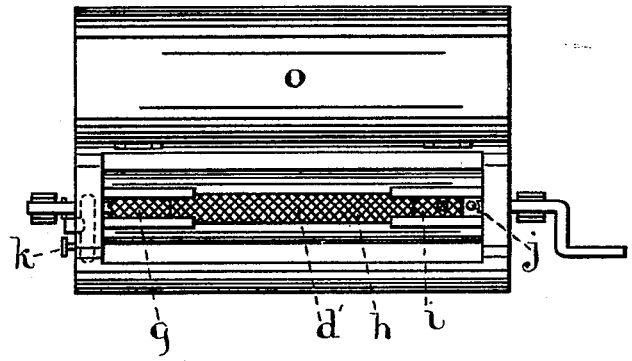
Figure 7:
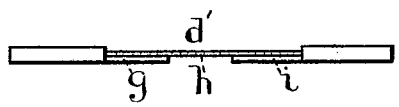

Figure 1 is a side elevation. Fig. 2 is an end view. Fig. 3 is an end view with parts broken out. Fig. 4 is a side sectional elevation. Fig. 5 is a section. Fig. 6 is a top view with the cover raised. Fig. 7 is an edge view of the perforated cover.

Same letters show like parts.

My invention relates to feather-renovators.

It consists of a jacketed cylinder having two steam-admission ports, two steam-exit ports, a perforated plate, for the admission of steam into the inner cylinder, the plate being made in sections, a cover, and a rotary agitator, as herein set forth, and all operating as described.

A shows the cylinder.

B is the jacket; C, the ends, which are solid, or so made that the steam does not pass into or through them.

$a$ is the steam-passage, connecting the two spaces $b$ $c$.

$d$ is a channel at the under side of the cylinder. It has no communication with the two spaces $b$ $c$. It is cut off from them by the side and end walls, $e$. $f$ is a steam-admission port leading into the channel $d$, by which means steam is admitted into the channel, and so into the interior of the cylinder A. The channel $d$ has a perforated cover, $d'$, made in sections $g$ $h$ $i$. This arrangement is adapted so that the perforated cover can be easily removed and cleansed, as it is likely to become foul by the impurities from the feathers becoming deposited thereon.

$j$ is a cock or aperture to let off the condensed steam from the renovating-chamber in the cylinder A.

$k$ is an admission cock or aperture to admit steam into the spaces $b$ and $c$.

$l$ is a cock or aperture to let off the condensed steam from the spaces $b$ and $c$.

$m$ is the agitator to turn and move the feathers while in the renovating-chamber and under the action of the steam. It is for that end furnished with pikes or points $n$.

O is a cover, comprising an arc of the circle formed by the jacket B, hinged to the jacket and closing as tight as requisite.

The operation is to place the feathers in the renovating-chamber, admit the steam, operate the agitator by revolving it, draw off the steam from the renovating-chamber when the feathers are sufficiently steamed and stirred, then admit the steam into the spaces $b$ and $c$, dry the feathers by this means, then tip the cylinder and turn them out.

What I claim as my invention, and desire to secure by Letters Patent of the United States, is—

In a feather-renovating machine, the combination of the cylinder A, jacket B, end pieces, C, steam-passage $a$, spaces $b$ and $c$, channel $d$, walls $e$, steam-ports $f$ and $k$, perforated cover $d'$, made in sections $g$ $h$ $i$, cock $j$, cock $l$, agitator $m$, and cover O, as herein set forth, to operate as described.

In testimony that I claim the foregoing as my own I affix my signature in presence of two witnesses.

ALEXANDER SPEIRS.

Witnesses:
WILLIAM HENRY CLIFFORD,
WM. S. GOODWIN.